United States Patent [19]

Field et al.

[11] Patent Number: 4,846,297

[45] Date of Patent: Jul. 11, 1989

[54] AUTOMATED GUIDED VEHICLE

[75] Inventors: Bruce F. Field, Minneapolis; Joseph G. Kasper, Golden Valley, both of Minn.

[73] Assignee: Tennant Company, Minneapolis, Minn.

[21] Appl. No.: 222,894

[22] Filed: Jun. 22, 1988

Related U.S. Application Data

[62] Division of Ser. No. 101,508, Sep. 28, 1987, Pat. No. 4,790,402.

[51] Int. Cl.$^4$ ................................................ B62D 1/00
[52] U.S. Cl. .................................... 180/169; 318/587; 356/141; 358/103; 364/424.02
[58] Field of Search ....................... 180/167, 168, 169; 318/587; 364/424; 356/141; 358/93, 103, 229

[56] References Cited

U.S. PATENT DOCUMENTS

| | | | |
|---|---|---|---|
| 3,010,129 | 11/1961 | Moore | 15/1 |
| 3,713,505 | 1/1973 | Muller | 180/79.1 |
| 3,789,939 | 2/1974 | Geislinger | 180/6.5 |
| 3,956,361 | 4/1976 | Wilkins | 15/319 |
| 3,970,840 | 7/1976 | De Bruine | 180/168 X |
| 4,003,445 | 1/1977 | De Bruine | 180/168 |
| 4,028,533 | 6/1977 | Matsubara | 180/169 X |
| 4,099,669 | 7/1978 | Cortopassi | 180/167 X |
| 4,114,711 | 9/1978 | Wilkins | 180/169 |
| 4,309,758 | 1/1982 | Halsall et al. | 364/424 |
| 4,413,210 | 11/1983 | Gronau | 318/16 |
| 4,465,155 | 8/1984 | Collins | 180/169 |
| 4,530,057 | 7/1985 | Ahlbom | 318/587 X |
| 4,573,547 | 3/1986 | Yoshimura et al. | 180/168 |
| 4,613,804 | 9/1986 | Swenson | 318/587 |
| 4,626,995 | 12/1986 | Lofgren et al. | 364/424 |
| 4,630,109 | 12/1986 | Barton | 364/424 X |
| 4,647,784 | 3/1987 | Stephens | 250/561 |
| 4,665,487 | 5/1987 | Ogawa et al. | 180/168 X |
| 4,668,859 | 5/1987 | Winterer | 180/169 X |
| 4,670,648 | 6/1987 | Hall et al. | 250/216 |
| 4,675,935 | 6/1987 | Kasper et al. | 15/319 |
| 4,700,427 | 10/1987 | Knepper | 180/169 X |
| 4,709,771 | 12/1987 | Basham et al. | 180/6.5 |
| 4,727,492 | 2/1988 | Reeve et al. | 180/169 X |

Primary Examiner—Charles A. Marmor
Assistant Examiner—Michael Mar
Attorney, Agent, or Firm—Kinzer, Plyer, Dorn, McEachran & Jambor

[57] ABSTRACT

An unmanned, self-propelled vehicle in the nature of a mobile robot has an on-board computer that stores path and machine function instructions and activates the drive and steering systems so as to cause the machine to follow a desired path. A plurality of retroreflective targets are mounted along the desired path. They do not have to be mounted at a specific height or distance apart, nor need they be square to the path. An improved guidance system for keeping the vehicle on the prescribed path includes a laterally scanning laser transmitter-receiver mounted on the vehicle. An electromechanical tracking device controls the angle of elevation of the laser beam so as to keep it aimed at each target successively as the vehicle moves. The laser produces signals which steer the vehicle such that the laser transmitter and targets are kept aligned in a vertical plane. A positioning device can move the laser transmitter transversely on the vehicle so that the vehicle centerline may travel in the vertical plane of the laser or may travel in an offset line parallel to the vertical laser plane. Certain ones of the targets are bar coded and a target counter senses and counts them as the machine moves past them to keep track of where the vehicle is located along its desired path. A motion sensing system using reflective microwave sensors provides speed and distance information.

20 Claims, 4 Drawing Sheets

AUTOMATED GUIDED VEHICLE

This is a divisional of co-pending application Ser. No. 101,508 filed on Sept. 28, 1987, now U.S. Pat. No. 4,790,402.

BACKGROUND OF THE INVENTION

This invention relates to automated guided vehicles and is particularly concerned with a self-propelled unmanned vehicle having a path definition apparatus which readily permits path changes.

Previously known automated guided vehicles (AGV's) have suffered from guidance systems which are either inflexible or complex. Inflexible guidance systems make the AGV unfit for general purposes. Complexity makes them expensive and unreliable. As a result, the use of AGV's has been limited to special applications.

The most inflexible AGV's are guided inductively by a wire set into the floor. Such systems are expensive to install or modify if new conditions make a different route desirable. An improved design uses path-defining targets or markers placed on the floor or walls at specified locations. In such systems the AGV has a sensing element which "knows" where to look for the markers. While this is an improvement over built-in systems, it has the drawback that precise marker placement is critical to keeping the AGV on course.

ADVANTAGES OF THE INVENTION

The present invention seeks to overcome these difficulties by providing an unmanned self-propelled vehicle having an improved guidance system using a laser scanner and retroreflective targets. This guidance system makes it easier and less expensive to set up or change the vehicle's route than with a wire-guided machine. It also makes it easier to set up the targets than with other light-guided machines.

The guidance system of the present invention has the capability of laterally offsetting the course of the vehicle, to steer around small objects. It can hold a course parallel to, but offset from, the target line while still sighting directly forward to a target. Prior systems require elaborate computerized trigonometric algorithms to accomplish what the present invention does with a simple mechanical arrangement. Further, the guidance system is not affected by the pitching resulting from traveling on an undulating floor.

The height and distance of the targets are not critical. The only requirement is that they be within range of the laser, or about 50 feet. The angular position of the targets (squareness to the incident laser beam) is not critical, either. They can be misaligned by as much as 30 degrees and still reflect the laser. The lateral location of the targets should be controlled as closely as the desired accuracy in the track. However, small errors in target placement can be compensated for by programming offset corrections into the laser positioner. Prior art light-beam systems require locating targets with the precision of a surveyor's transit. The present system is much less demanding.

The width of the targets is not critical, and the targets need not be of uniform width. This is because the laser scanner sweeps across the targets and records the angle when striking a target and the angle when leaving it. The angles are averaged to create an output signal. Thus, the horizontal center of the target will be used regardless of the target's width.

The machine does not have to be placed in a precisely exact position at the start of the desired path, nor does it have to be pointed directly at the first target. It can be up to 45 degrees off course at the start and still correct itself. The machine can operate in total darkness or in bright sunlight or anywhere in between. It will not be disturbed by extraneous light. The light signals are intrinsically immune to electromagnetic interference (EMI), and the guidance system does not emit any EMI except when telemetry is triggered.

The navigation system of the present invention is adaptable both to vehicles with two-wheel differential steering and to vehicles with conventional steerable wheels. It can be adapted to work with targets set in the floor so it could be used outdoors. In this connection, it could be used in conjunction with a wire-guided AGV to give it off-wire capability at selected sections of its route. The switch over from one system to the other could be automatic. Thus, if part of a route lies outdoors where overhead targets are impractical, a guide wire may be laid in the pavement. If part of the route is indoors, overhead targets may be installed. This would be especially helpful where steel floors o decks make installation of guide wires impossible.

The on-board guidance system of the present invention is not large, being on the order of a bread box in size. It is rugged and can tolerate industrial service. It uses very little power, on the order of 12 watts. The guidance system is built, for the most part, from commercially available components, and, therefore, is inexpensive compared to other prior art systems. This also facilitates troubleshooting, repair and routine maintenance service. The accuracy of the guidance system is well within the limits required for safe, efficient operation of an AGV. When considering the guidance system's cost, accuracy and flexibility, it is a marked improvement over known systems.

SUMMARY OF THE INVENTION

The automated guided vehicle of the present invention has a frame supported by wheels which are driven by motors mounted on the frame. An on-board computer has a desired course or path programmed into it, and controls the steering system when programmed turns are called for so as to cause the vehicle to follow the prescribed path. A laterally scanning laser looks for targets placed along the path. A vertical tracking device aims the scanner at a target and repeatedly adjusts the vertical aiming to maintain a target continuously in view of the scanner as the vehicle moves. When the vehicle is about to pass a target, the laser tracking device releases that target, searches forward for the next one and locks onto it as the vehicle continues to move. The laser scanner controls the steering of the vehicle between programmed turns such that a vertical plane through the center of the laser scanner unit and parallel to the longitudinal axis of the machine is always aligned with the current target.

The vehicle can be made to travel parallel to the laser-target vertical plane but laterally offset from that plane. This is done by moving the position of the laser scanner laterally relative to the machine. Such lateral movement in one direction induces in the steering system a correction in the opposite direction. Thus, while the laser scanner and targets are always in an aligned relationship, the longitudinal center of the vehicle need not always be in such a relationship. In other words, the vehicle is steered such that the laser scanner and targets generally lie in a vertical plane perpendicular to the face of the scanner. By shifting the lateral position of the laser scanner on the vehicle, the vehicle can be made to travel on either side of the vertical plane, and parallel to it. This is useful for steering around small obstacles or for making parallel trips as, for example, a sweeper that is used to sweep an aisle that is twice as wide as the sweeping path of the machine.

The guidance system further includes an infrared photoelectric target counter for keeping track of where the vehicle is located along a certain path. A velocity measurement system (using a non-contact, Doppler microwave sensor which reads motion over the floor) permits calculation of the distance the vehicle has moved past the last target. The on-board computer system controls the machine's movements relative to the targets, i.e., it controls the lateral positioning of the laser scanner, tells the machine when to turn left or right, when to go forward, when to back up, etc. Sensors are provided for detecting obstacles in the path of the machine, as well as for providing emergency shutdown and a remote alarm in the event of a collision, malfunction or the like.

The vehicle of the present invention is particularly adapted for use as a floor sweeper or other floor treating machine. The computer can be programmed to control such automated functions as brush control, water flow, squeegee lift and filter cleaning or others as desired. The vehicle shown and described herein is a floor sweeper, although it will be understood that the invention is not limited to this application.

DETAILED DESCRIPTION OF THE INVENTION

I. The Vehicle in General

Figure 1:
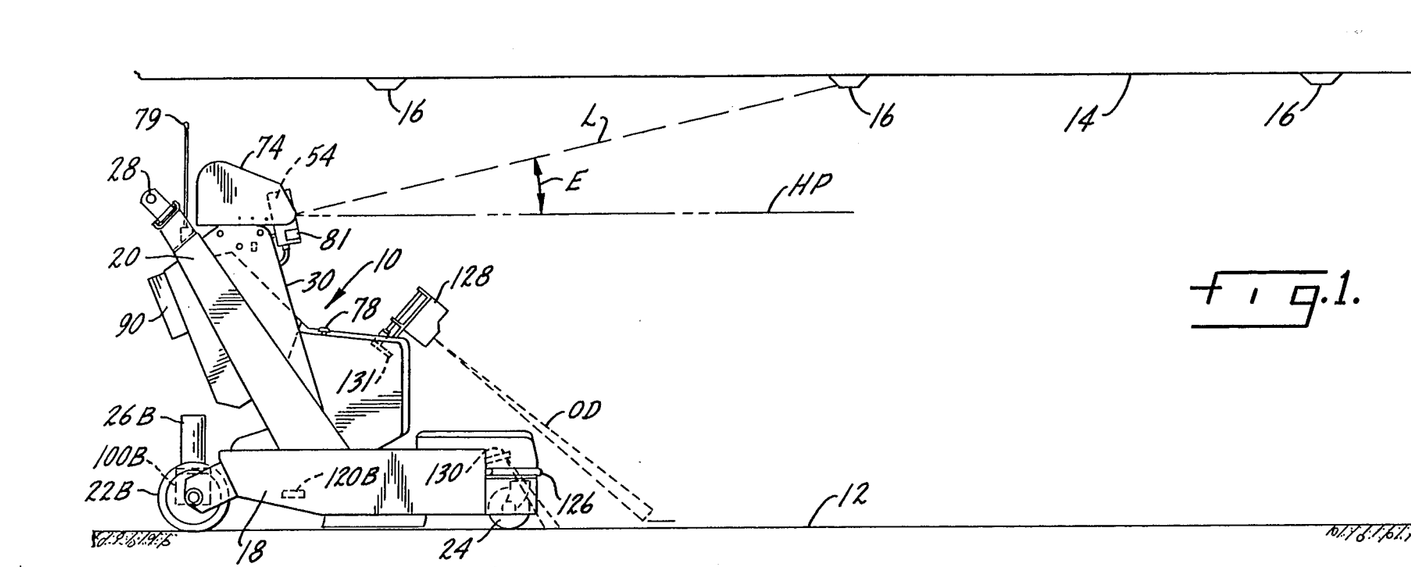
FIG. 1 is a side elevation view of a sweeper in a room with a floor and ceiling, the sweeper being equipped with the navigation system of the present invention and the room being equipped with ceiling-mounted retroreflective targets.
Figure 2:
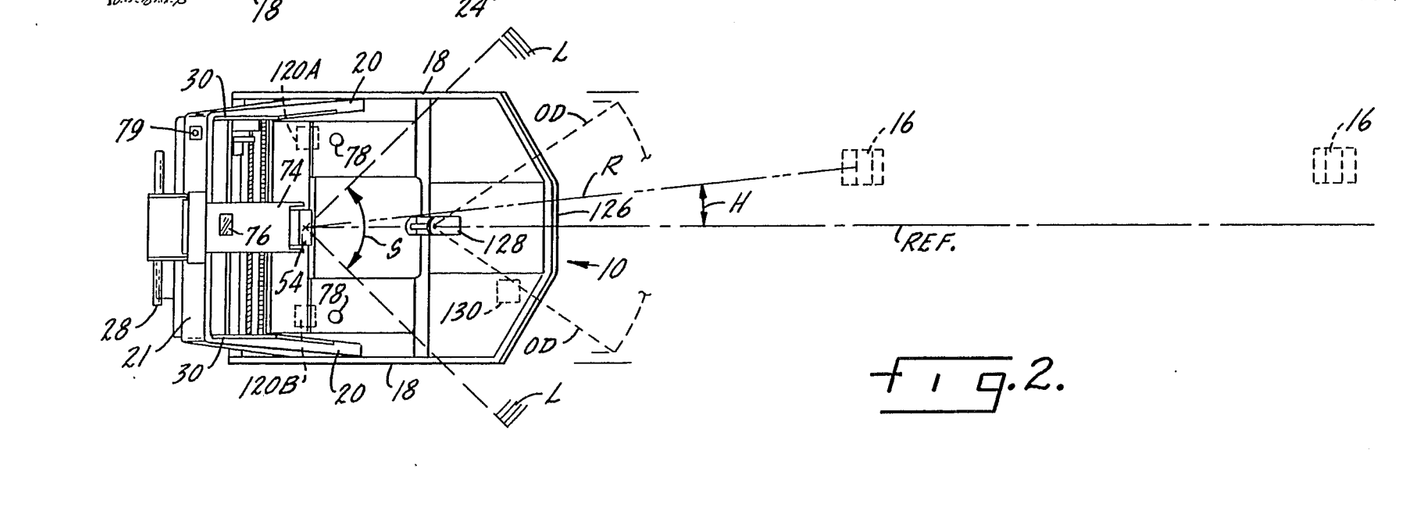
FIG. 2 is a plan view of the sweeper of FIG. 1.

The automated guided vehicle 10 of the present invention is shown in FIGS. 1 and 2 in its operating environment which typically includes a floor 12 and a ceiling 14. A plurality of light-reflective targets 16 are attached to the ceiling. The targets are high-grade retroreflective material such as that supplied by 3M Corporation of St. Paul, Minn. The targets efficiently reflect incident light parallel to the incoming beam, even with the target as much as 30 degrees off perpendicular to the beam path.

The vehicle shown is a sweeping machine. It includes a frame 18 on which is mounted the usual equipment for a sweeper, such as a brush and drive motor therefor, a dirt hopper, a power source such as a set of batteries and associated controls. These may be similar to the equipment found on the model 140E sweeper manufactured and sold by Tennant Company. The frame 18 has a pair of upright members 20 which are joined by a crosspiece 21. The frame is supported by two rear wheels 22A, 22B and a front caster 24. The rear wheels have individual drive motors 26A, 26B for independently driving the two rea wheels through right angle reduction gear boxes 100A, 100B. Steering control of the vehicle is effected by controlling the power supplied to the two motors 26, although other steering arrangements could be used, such as one or more steerable wheels. Manual control of the vehicle is available through the handles 28 which activate control circuitry, as shown and described in U.S. patent application Ser. No. 853,865, filed Apr. 21, 1986, and assigned to the present assignee. The disclosure of that application is incorporated herein by reference.

II. The Laser Positioner

Figures 3, 4, 5, 8, 9, 10:
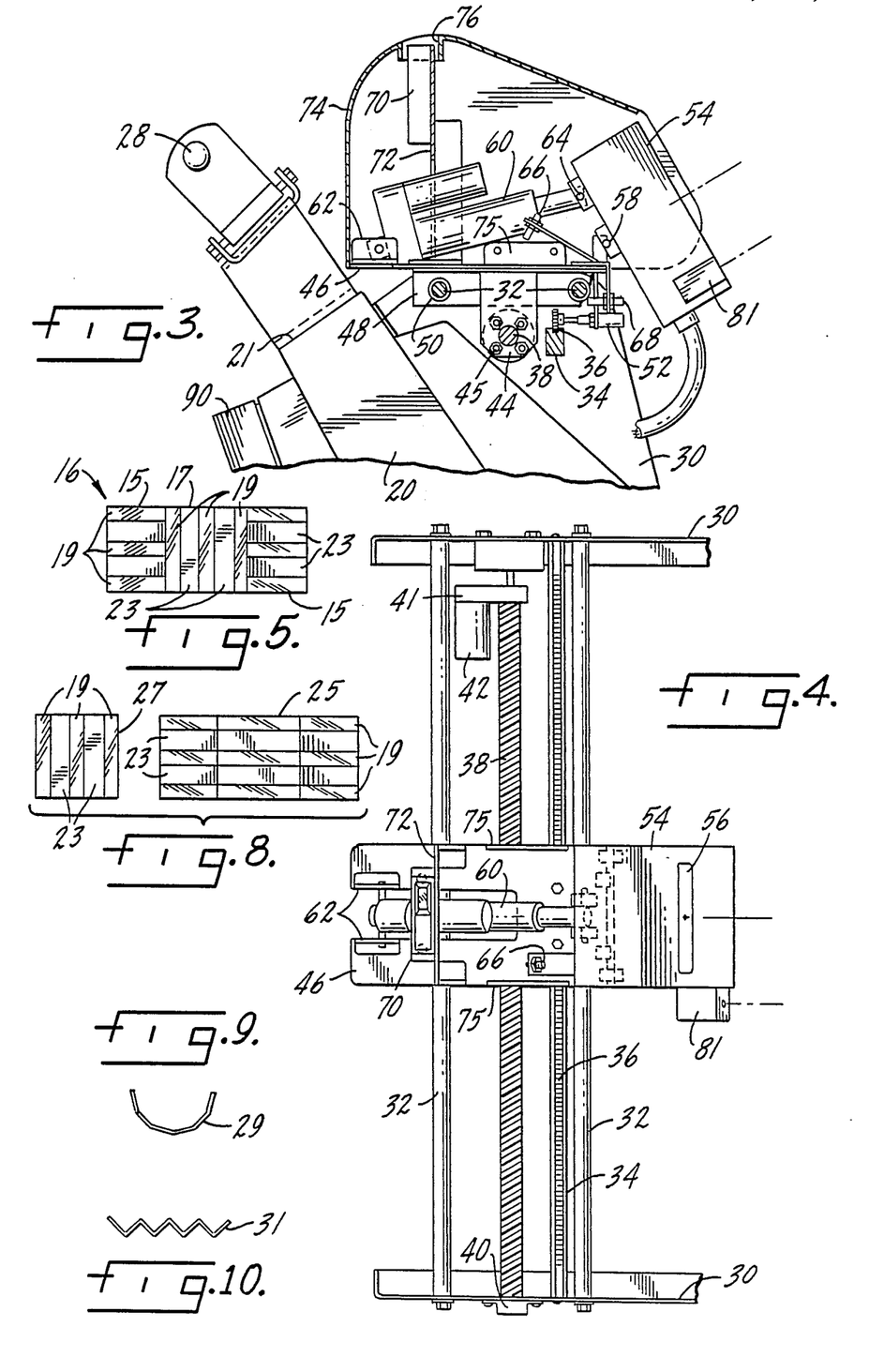
FIG. 3 is an enlarged side elevation view of the tracking and positioning mechanisms, with parts in section.
FIG. 4 is a plan view of the components shown in FIG. 3.
FIG. 5 is an underside plan view of a coded target.
FIG. 8 is an underside plan view of an alternate form of coded target.
FIG. 9 is a side elevation view of a further alternate form of target.
FIG. 10 is a side elevation view of another alternate form of target.

The details of the automatic guidance system's mechanical aspects are best seen in FIGS. 3 and 4. The guidance system components are mounted on side frames 30, which in turn are attached to the upright members 20 of the frame. Two parallel guide ways 32 extend between the side frames 30 and are bolted thereto. A bar 34 extends between the side frames 30 and has a gear rack 36 formed or attached on its upper surface. The gear rack may be a molded plastic part which is attached to the top of the bar. A threaded lead screw 38 is disposed between the side frames 30 and is rotatably mounted in bearing 40 and gear box 41. The screw 38 can be rotated by a motor 42, driving through gear box 41 as illustrated in FIG. 4. The screw passes through an opening in an extension 44 (FIG. 3). A ball nut (not shown) is mounted to the extension 44 by bolts 45. The ball nut provides a connection between the screw 38 and extension 44 whereby the extension will be moved along the screw when the screw is rotated by the motor 42.

The extension 44 is connected to a platform 46. A pair of support members 48 depend from the side edges of the platform. Each support 48 has a pair of openings carrying bushings 50 through which the parallel guide ways 32 extend. The platform is thus slidably supported on the guide ways and is carried therealong when motor 42 rotates screw 38. A potentiometer 52 is attached to the underside of the platform. The potentiometer has a pinion gear which engages the gear rack 36 to move the wiper of the potentiometer as the platform slides on the guide ways 32.

The platform 46 and the components which support and move it, together with associated control circuitry to be described below, form a positioning means for moving portions of the guidance system laterally on the vehicle.

III. The Laser Scanner

The guidance system has a sighting means for sensing the vehicle's location relative to the targets 16. In the embodiment shown in FIGS. 3,4 and 6, the sighting means is a laser scanner, the housing of which is illustrated at 54. This device has a helium-neon laser light source 108 producing 0.5 milliwatts (with a maximum not to exceed 2.0 milliwatts) of visible red light. The light source is incident on a rotating mirror via a series of beam directors. The rotating mirror directs the output beam in a lateral sweep through the front aperture 56 (FIG. 4). The front aperture has a ±45 degree viewing angle on either side of a reference line normal to the face of the housing. Thus, there is a 90 degree scanning angle. The laser scanner includes a receiving means in the form of a photo-detector 110. Light reflected from a target 16 and returned to the unit is focused through a lens onto the photo-detector. The photo-detector output signal is sent to a microprocessor 112 in the laser scanner for processing. The photodetector is triggered on each scan to provide a gate pulse. The laser beam scans at approximately 20 scans per second. The scanner also includes a built-in digital-to-analog convertor to provide 0–10 VDC analog output for measuring the angle of the reflective beam from the target to the reference line of the transmitter. A laser scanner of the type described is available from Namco Controls of Mentor, Ohio, under their trademark "Lasernet".

IV. The Laser Tracker

The laser scanner housing 54 is pivotally mounted on the platform 46 by hinges 58. The angle of elevation of the light beam emitted by the laser scanner is controlled by an electromechanical linear actuator 60. The actuator motor uses a dual pulse width modulated (PWM) type of motor control so there are two different scan rates, one for up and one for down. The actuator also uses a solid state H-bridge type of switching arrangement and an electronic brake. The electronic brake locks up the actuator immediately upon re-establishment of a target-in-view signal, as explained below. The actuator may be of a type sold by Warner Electric Company of South Beloit, Ill. The actuator is pivotally connected to two brackets 62, which in turn are attached to the platform 46. The opposite end of the actuator 60 is pivotally attached to the back of the scanner housing 54 as at 64. Upper and lower limit switches in the form of proximity switches 66 and 68 are mounted on the platform 46. These switches provide signals which limit the amount of tilt, either upwardly or downwardly, which will be permitted for the laser scanner housing. The actuator 60 and the limit switches 66, 68, together with associated circuitry to be described below, form a tracking means which controls the angle of elevation of the transmitted light beam to keep it fixed in turn on each of a succession of reflective targets.

The actuator 60 has two speeds; a higher speed when the actuator has reached a limit switch and is searching for the next target, and a lower speed when it is within its range and is incrementing to keep a given target in view as the machine travels. The lower speed is modified by a voltage ramp (on the order of one-fourth second) which starts the actuator travel gradually to avoid jerkiness in keeping on a target. The inertia of the actuator motor rotor contributes further to this smooth startup. This action tends to automatically compensate for faster or slower vehicle speed. At a faster speed, the target-holding increments become longer and more frequent. The actuator motor runs longer and builds up higher speed, so the longer and more frequent increments don't require too much more time. When the target is again in view, a dynamic brake stops the actuator motor almost instantly to prevent overshoot. However, a slight time delay is built in to allow the laser beam to move part way onto the target face rather than stopping right at its leading edge. This allows the laser to stay on the target for a little while before it loses the target, thus reducing the frequency of incremental tracker corrections. This time delay is made adjustable so that it can be set to accommodate different sizes of targets and different distances to the target.

V The Targets and Target Counter

The navigation system further includes an infrared photoelectric sensor 70 mounted on a bracket 72 which is attached to the platform 46. The photoelectric sensor is focused upwardly in a vertical direction. It may be of the transmission type as sold by McGill Manufacturing Co. Of Valparaiso, Ind. The sensor both transmits light signals and senses reflected light returned to the unit. If directed at a bar coded reflective target, the sensor, together with associated external decoding circuitry, is capable of sensing the coding on the target.

A cover 74 may be mounted on the platform 46 by brackets 75 to partially enclose the guidance system components. The cover has an opening 76 to permit emission of a beam from the photoelectric sensor 70 and to accept a reflected beam to it. Also, the front of the cover is open to accommodate the transmitted and reflected beams of the laser scanner 54. The cover has been omitted in FIG. 4.

FIG. 5 illustrates the underside of a target 16. In one functional form the targets have two planar surfaces 15 inclined at 45 degrees to the horizontal and one horizontal planar surface 17. The targets may be about three inches wide but they need not be precisely dimensioned. They can be mounted in any convenient manner, e.g., magnets or tape. Some of the targets may be coded by bars of reflective stripes 19 spaced apart by intervening non-reflective areas 23. The stripes 19 on the surfaces 15 are parallel to the vehicle's direction of travel while those on surface 17 lie laterally to the machine's path. Thus the code on surfaces 15 can be read by the laser scanner and will be called laser codes. Similarly, the code on surface 17 is readily distinguishable by the photoelectric sensor 70 as it passes underneath a target. These will be called bar codes. The bar and laser codes could have any combination of reflective and non-reflective areas. The codes shown are illustrative. It is not necessary that all targets be coded. The purpose of the codes will be explained below.

Alternate forms of targets are shown in FIGS. 8–10. FIG. 8 shows a target 25 shaped the same as target 16 but, having a laser code only on all three surfaces. The bar code for sensor 70 is placed on a separate, flat target 27 which could be fastened directly to the ceiling wherever a major machine function was to occur. Further variations include the six-sided target 29 of FIG. 9 and the corrugated target 31 of FIG. 10. The latter has the advantage of minimal projection from the ceiling, on the order of one-half inch. Both targets 29 and 31 would carry laser coding only so they would be used with separate bar coded targets 27.

VI. Fault Detection Apparatus

The vehicle includes several fault detection devices. These devices shut down the machine if it encounters any operational difficulties. They are illustrated in FIGS. 1–4 and 6–7. Among the fault detection devices are two emergency shutdown switches or kill buttons 78 on top of the machine. One or more ultrasonic protection units 81 are mounted on the laser housing 54. These units point forwardly, parallel to the elevation of the laser beam. They operate continuously to detect objects which may be placed in front of the laser scanner, thereby blinding it. They have a relatively short range but when they detect an object they shut the machine down immediately. Other fault detectors shown at 83 may be responsive to low voltage, over current or similar conditions.

An infrared reflective obstacle detector 128 mounted near the front of the machine senses objects in the path of the machine as it moves forwardly. If an object is detected, the machine is shut off. The detector 128 is mounted on the output shaft of a windshield wiper motor 131 so that the detector scans back and forth through about 70 degrees at a rate of about one scan per second. The boundaries of the scan are indicated at OD in FIGS. 1 and 2. Preferably the detector's light beam is focused forwardly and downwardly as shown such that it just clears the front of the machine frame. Its range is set just short of striking the floor. With these parameters the extreme edges of its scan are about three-fourths of an inch inside the sides of the machine frame. Thus, the machine can pass through doorways or close to walls without triggering the detector. But it will detect any object about 17 inches in front of the machine at or near floor level. When it does so, it shuts down the vehicle. An adjustable range photoelectric switch made by Namco Controls of Mentor, Ohio has been found to be a suitable obstacle detector.

The fault detection apparatus further includes a floor in view sensor 130. This is a microwave motion sensor that looks downwardly and forwardly. If there is no floor to reflect back its signal, as at the top of a staircase or edge of a loading dock, it will shut down the vehicle. The MS1000 sensors made by Orion Engineering, Inc. of Clearwater, Fla. have been found suitable for this purpose.

A bumper switch 126 in the form of a membrane switch is mounted across the front of the machine. It is mounted on a strip of sponge rubber about 1"×1"×32" which is cemented to the frame. If the switch contacts with four ounces of pressure, it will stop the machine within the collapsing distance of the rubber. The obstacle detector 128 should stop the vehicle before it runs into anything. But if something gets past it, the bumper switch 126 will turn off the machine.

Figure 6:
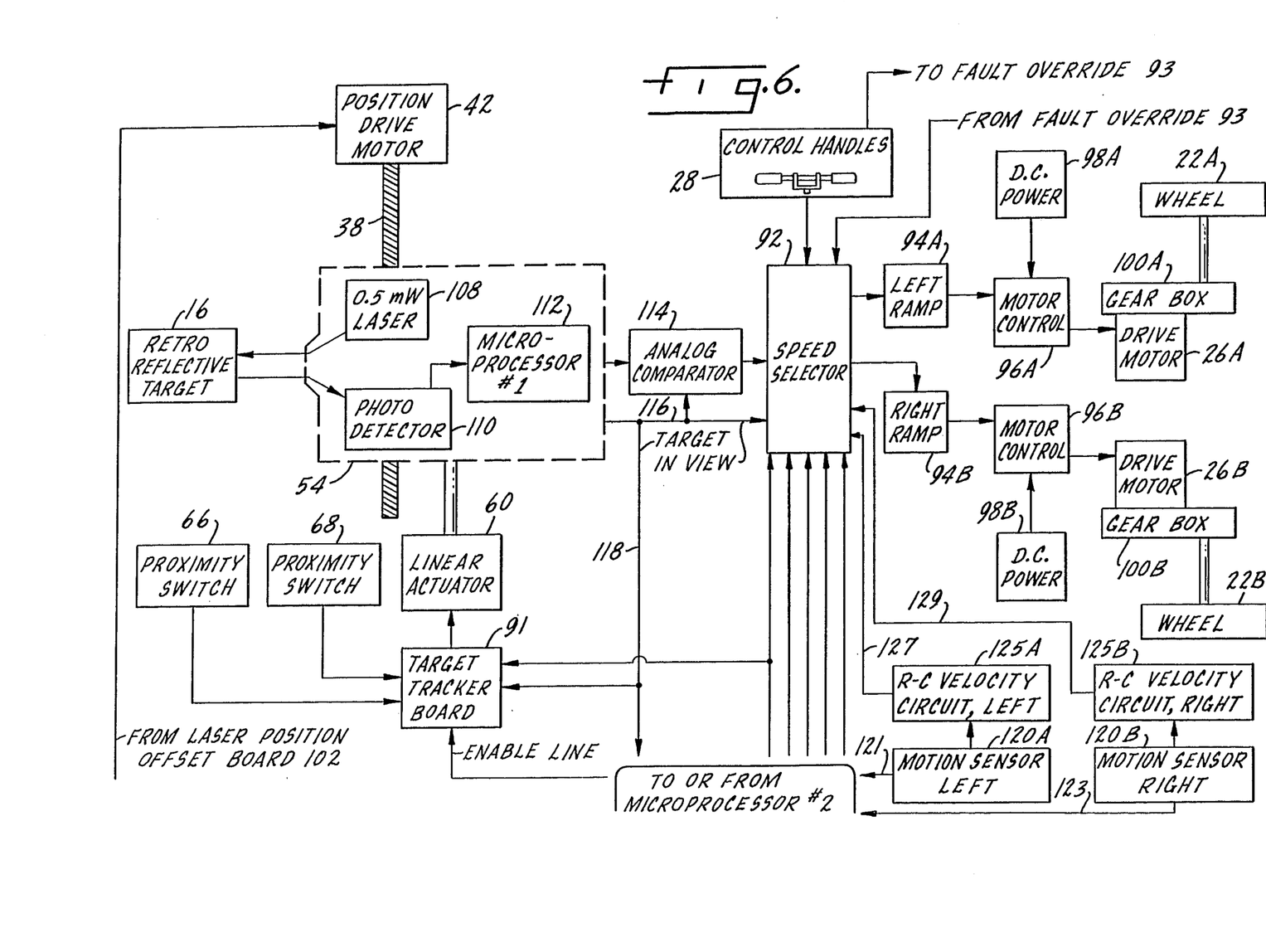
FIGS. 6 and 7 combine to form a block diagram of the guidance system.
Figure 7:
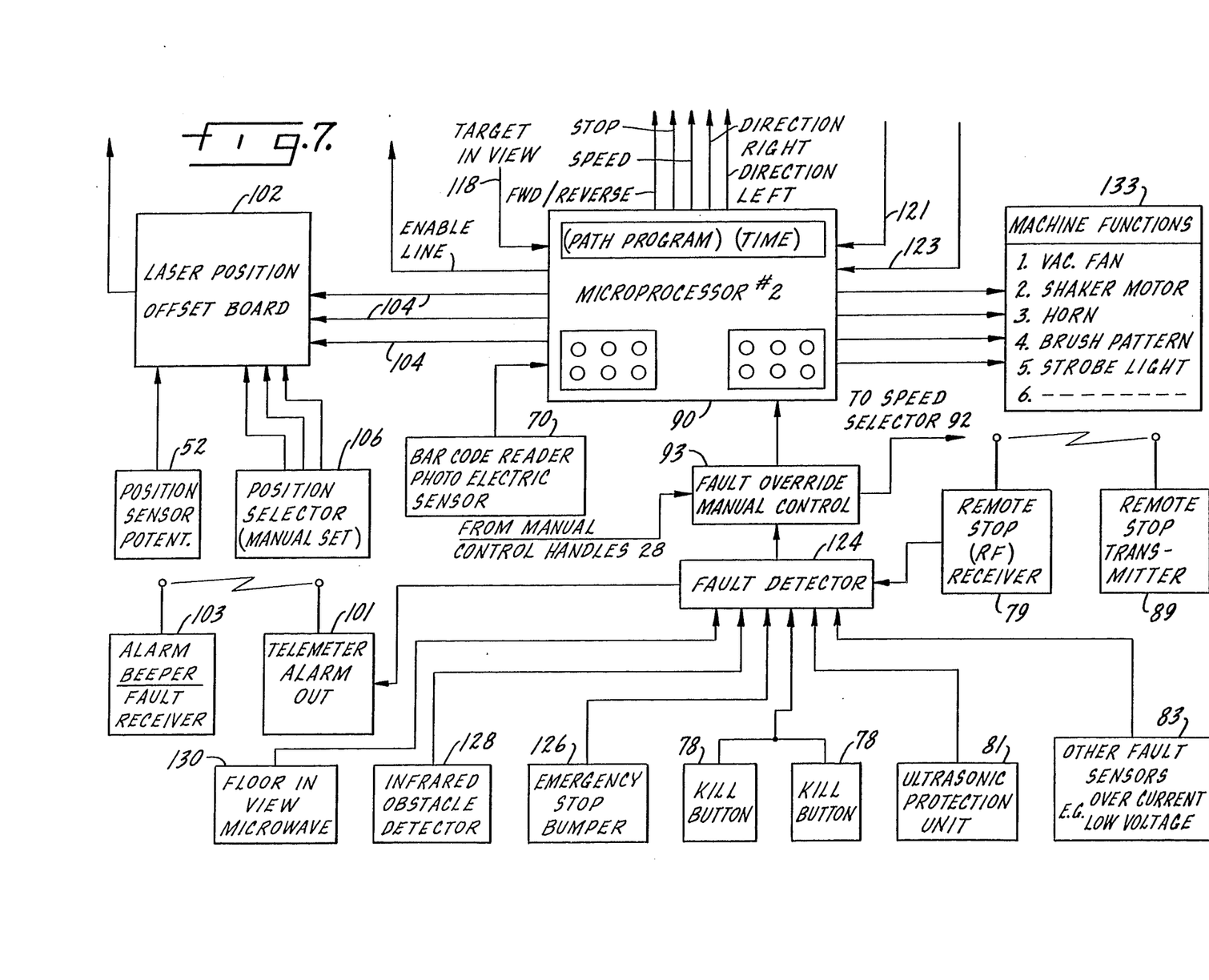

Whenever one of the fault sensors shuts down the machine telemeter 101 transmits a signal to a beeper 103 (see FIGS. 6 & 7). The beeper can be worn by supervisory personnel to inform them of the shut down. Similarly, a remote stop transmitter 89 is provided so supervisors can send a radio signal to receiver 79 on board the vehicle. The receiver sends a signal to a fault detector circuit 124 which shuts down the vehicle.

VII. Control Circuitry

A block diagram of the control system for the vehicle is shown in FIGS. 6 and 7. The overall operation of the vehicle is under the control of a computer 90 labeled "Microprocessor No. 2." The computer contains instructions for guiding the vehicle along a desired path or course which may be selected by an operator using a key pad that is part of the computer. The computer provides signals through output lines labeled "stop," "speed," "direction left", "direction right" and "forward/reverse" to a speed selector 92, which in turn drives left and right ramp circuits 94A and 94B. The ramps 94 govern operation of motor control circuits 96A, 96B which receive DC power from power supplies 98A, 98B. The motor control circuits 96 activate the drive motors 26A, 26B, which in turn drive wheels 22A, 22B through gear boxes 100A, 100B.

Steering control is accomplished by the ramp circuits 94. The ramps will either slow down or speed up one of the drive motors 26 as required to turn the vehicle in the desired direction. A detailed description of this steering system may be found in co-pending U.S. patent application Ser. No. 853,865, filed Apr. 21, 1986, and assigned to the assignee of this application. The computer may effect intentional course changes directly through the direction left and direction right lines to the speed selector 92. Or the computer may generate intentional course changes through the guidance system by causing the laser positioner to move platform 46 laterally, thereby intentionally inducing misalignment between the sighting means and the targets. This is accomplished through a laser position offset board 102 in a manner which will be described n detail below.

Optionally, instead of two-wheel differential speed steering, the vehicle may be steered with one or more steerable wheels. These would be steered by an electric actuator that would be controlled by the computer.

The offset board 102 receives an input from the computer 90 through lines 104. There are as many lines 104 as desired positions of the platform 46. While three such lines have been shown, a different number could be used. The positions of the platform are defined by a position selector 106 which may be manually programmed. The position selector defines a discreet voltage level corresponding to each of the desired positions of the platform available through lines 104. This allows the offset board 102 to correlate the position requested through lines 104 with the position information provided by the potentiometer 52 and activate the motor 42 accordingly. The potentiometer 52 is a 10-turn resistor which is accurate to ±1%. It is an analog-type measuring device. Its shaft carries a gear which meshes with gear rack 36 and is sized so that the shaft of potentiometer 52 completes 6.25 turns while platform 46 is moving the full length of guide ways 32. The voltage to the variable 10-turn potentiometer is exactly 8 volts, which is generated through a precision power supply on the board 102 so each turn of the potentiometer gives a voltage increment of 0.8 volts. When the platform 46 is all the way over to one extreme of the machine, the potentiometer 52 is set to deliver 1.5 VDC, and when the platform is all the way over to the other extreme, the voltage will be 6.5 VDC. The voltage will be broken up evenly throughout the range of travel between the two extremes.

As mentioned above, the laser scanner unit 54 includes a scanning laser beam 108 transmitting laser light toward a target 16. A photo-detector 110 in the laser scanner senses light reflected from a target and provides a target-in-view signal to the on-board microprocessor 112 which is built into the laser scanner unit 54. The target-in-view signal is a digital high when the photo-detector senses reflected light and a digital low when no light is sensed. The microprocessor 112 provides an "analog out" signal to an analog comparator 114. The target-in-view signal is fed on lines 116 and 118 to the analog comparator 114, the speed selector 92, the computer 90 and a target tracker board 91.

The control circuit also has left and right microwave motion sensors 120A, 120B. These are mounted at the sides of the vehicle (see FIGS. 1 and 2). Their output is a series of pulses; 500 per foot as they are moved along over the floor. Counting these pulses will give a measurement of distance traveled. The left-hand sensor is used in this way to measure distance traveled past a bar coded target for initiating a programmed action. The motion sensors are also used to determine turns. In all turns the inside drive wheel is stopped and the outside drive wheel continues rotating to turn the machine. The output of the motion sensor 120 on the outside of the turn is counted to control the turn, since it is known how many pulses will be registered in a particular turn. This control is through lines 121 and 123 to the computer 90. The MS1000 sensors made by Orion Engineering, Inc. of Clearwater, Fla. have been found to be suitable motion sensors.

The computer also receives an input from a fault detector circuit 24 through a fault override 93. This circuit receives signals from the two kill buttons 78, the emergency stop bumper 126, the infrared obstacle detector 128, the microwave floor in view detector 130, the ultrasonic unit 81, other fault sensors 83 and the remote stop receiver 79.

The computer 90 also controls machine functions, as shown at 133. In the case of a sweeper, these functions may include a vacuum fan, a shaker motor, a horn, a strobe light and the like. Such automatic monitoring and control of machine functions are described in U.S. Pat. No. 4,675,935, assigned to assignee of this application.

Computer control over the vehicle can be overridden by the manual control handles 28. If the handles 28 are activated, computer control over the speed selector 92 and the ramp circuits 94 is disabled, and the fault detector 124 is overridden by fault override 93. Alternatively, a joy stick could be used in place of the control handles, but it is less effective. The use, operation and function of the automatic guided vehicle are as follows.

VIII. Operation of the Laser Tracker

The laser scanner 54 emits a light beam perpendicular to the face of its housing. The beam is rotated through a lateral scanning angle of 90 degrees. This scanning angle is shown at S in FIG. 2. Thus, the swept beam defines a plane L within the boundaries of the scanning angle.

The tracking means of the invention controls the angle of elevation of the light beam plane L with respect to a horizontal plane. This is illustrated in FIG. 1 where the plane of the transmitted light beam L is illustrated at an angle of elevation E above a horizontal plane HP. When light is transmitted at the proper angle of elevation E such that the transmitted light L impinges on a target 16, the target will reflect a return signal or beam to the optical sensor 110 in the laser scanner. This light beam is illustrated at line R in FIG. 2. When the sensor 110 detects a reflected light beam it generates the target-in-view signal.

As the machine moves, the plane of the transmitted light L will lose contact with the target 16 and the target-in-view signal will be lost. When this happens the microprocessor 112 sends a signal through line 118 to the target tracker board 91 which directs the linear actuator 60 to change the angle of elevation E as required to regain a target-in-view signal. If the machine is moving forwardly, the angle of elevation E will be increased until the target-in-view signal is regained. Conversely, if the machine is moving backwardly, the angle of elevation E will be decreased. The time needed to alter the angle of elevation to regain the target-in-view signal is on the order of 100 milliseconds. Until the target-in-view signal is regained, the two drive motors 26 are brought to equal speed so the machine will travel in a straight line and not wander off course during corrections in the angle of elevation.

These changes in the angle of elevation can only take place within the limits of the proximity switches 66, 68. When one of the limits is exceeded, the current target is abandoned, and the tracking means changes the angle of elevation so as to search for the next target. In the ordinary situation when the machine is moving forwardly, the upper proximity switch 66 will be activated and actuator 60 will tilt the laser scanner forwardly, decreasing the angle of elevation until the transmitted light beam plane L intersects the next target, resulting in reflected light being detected at the scanner, which in turn re-establishes the target-in-view signal. The opposite action takes place if the vehicle is moving backwardly. The proximity switches are located to permit the vehicle to approach to within about three feet of a target before releasing that target and searching for a new one. This distance will, of course, depend on the target height and it could be other than the three feet selected for the illustrated vehicle.

The microprocessor 112 in the laser scanner defines a reference line REF which is the bisector of the scanning angle S (FIG. 2). The microprocessor can calculate the heading error angle H between the reflected light beam R and the reference line REF. This is done by triggering a clock when a scan of the transmitted light beam begins. Since the beam rotates at a constant, known rate (and since the target reflects light parallel to the incident beam), a measurement of the time between when the beam is on the reference line and the time when the reflected beam is returned from the target ca be used to calculate the angle at which the target lies. The scanner records the time when the beam is first reflected as it approaches the target, and the time when it is last reflected as it leaves the target, then takes the median time between the two as its time measurement. This makes the width of the target non-critical. The laser scanner uses its digital to analog (D/A) converter to translate the time measurement to an analog signal representative of the heading error angle. The heading error angle measurement is then fed to the analog comparator 114.

If the target-in-view signal is high, the comparator 114 is enabled and the analog output of the microprocessor 112 is compared with a known reference voltage to determine if the heading error angle H is zero. If it is not, the speed selector 92 activates one of the ramps 94 as required to activate the appropriate drive motor 26 and create a steering correction which reduces the heading error angle H to zero. The effect of this response to the heading error angle measurement is to keep the heading of the laser scanner in a vertical plane with the target 16. Since the laser scanner is mounted on the vehicle frame such that the reference line REF is always parallel to the machine's longitudinal center line, the guidance system will cause the machine to always be heading parallel to the scanner-target vertical plane. However, as will be described below, the machine's center line may be offset to one side or the other of the scanner-target vertical plane.

The ramp circuits 94 will select differing slopes of the steering ramps at various times. An appropriate slope will be selected to prevent steering over-correction and will be dependent on vehicle speed. For example, if the machine is traveling at a very slow speed as signaled by a motion sensor 120A, the ramp circuit 94 will choose a steep slope to quickly slow down the drive motor 26 on the inside of the turn and effect a fast steering correction. Conversely, if the machine is traveling at high speed, the ramp circuit 94 will choose a more gradual slope to prevent over-correction, allowing the machine to run a more precise path while corrections are being made. In other words, ramp slopes are chosen to effect prompt steering corrections without hunting. The values of the ram slopes available to the ramp circuits 94 are set up empirically for each type of machine. After a steering correction, the ramp back up to nominal travel speed is unaffected by vehicle speed.

If the vehicle exceeds the permissible angular variance from the desired path, the heading error angle H measured at the analog comparator 114 will exceed predetermined limits (on either side of the reference line REF). Should such a condition persist for more than a set period of time, say three seconds, the analog comparator 114 will provide a fault signal that shuts down the machine.

When the tracking means is searching for a new target, the target-in-view signal is low and this information is supplied to the speed selector 92 through the line 116. This overrides any steering corrections that may have been in progress just prior to releasing the prior target. The speed selector then directs the ramp circuits 94 to drive both motors 26 at the same speed as determined by signals from motion sensors 120A and 120B. Their outputs are fed to two resistance-capacitance circuits 125A, 125B that count the pulses per second, or distance per unit of time, which is velocity, or speed. The right and left R-C circuits 125A and 125B control the drive wheels through lines 127, 129 to speed selector 92 to keep the two sensor outputs equal so the velocity is the same on both sides of the machine and it travels straight. The right sensor is used as a reference, and the left wheel is speeded up or slowed down to keep the left sensor equal to the right one. As a result, during a search for a new target, the vehicle will move in a straight line to prevent steering over correction.

The time required to find the next target is relatively short, on the order of one second or less. If for some reason the new target is not found in three seconds, the computer will shut the vehicle down. In other words, the computer will allow the vehicle to travel without a target-in-view signal for only three seconds. Some other default time period could be selected, but three seconds has been found a suitable time limit for reasons of safety.

To summarize operations described to this point, the tracking means will control the angle of elevation E as required to maintain a target-in-view signal substantially at all times. When the vehicle gets so close to a target that the angle of elevation exceeds a predetermined limit, the tracking means will alter the angle of elevation to find the next target. Once it is found, the tracking means locks onto that target so as to keep the target-in-view signal. Also, the vehicle is steered so as to reduce any measured heading error angle to zero, thus keeping the sighting means 54 headed in a vertical plane defined by the reference line REF and the targets 16.

IX. Operation of the Laser Positioner

There may be times when it is desirable to shift or offset the vehicle from the vertical plane defined by the reference line REF and targets 16. For example, with a sweeping machine it may be advantageous to place targets in the center of an aisle and sweep down the right side of the aisle on one pass and down the opposite side on a return pass. The offset feature allows the machine to cover an area nearly twice its width with only one set of targets. This can be done using the positioning means to offset the sighting means laterally relative to the vehicle. The computer 90 controls the location of the platform 46 by selecting a position through the lines 104. The laser position offset board 102 compares the current position information provided by the potentiometer 52 with the instructed position from the computer, as defined by the position selector 106, which is manually programmable. The board 102 activates the motor 42 to move the platform as required. When the platform moves, the pinion gear on potentiometer 52 engages the gear rack 36, thereby turning the potentiometer and providing a feedback signal indicative of the platform's current position. When the position corresponds to that selected by the computer and defined by the position selector, the offset board 102 shuts off the motor 42. The positioner takes about 11 seconds to travel from one extreme to the other. The reason for the slow travel is to cause the machine to make an even, steady transition from one direction to another.

When the laser positioner moves the laser scanner in one direction, say to the left, a non-zero heading error angle will be created. The speed selector 92 will then generate a steering correction in the opposite direction, i.e., to the right, so that the laser scanner will become realigned with the vertical plane through reference line REF and the target 16. Thus, the laser scanner remains aligned with the targets, at a zero heading error angle, but the vehicle itself is offset with respect to the targets, in this case to the right.

The overall course or path of the machine is contained in a set of instructions programmed into the computer 90. When defining the course for the vehicle to follow, the vehicle can be commanded to move forwardly while counting x bar coded targets, turn right or left x number of degrees, shift the laser positioner to a selected position, select forward or reverse, select a speed, wait, stop and various housekeeping functions. The computer has programmed into it detailed instructions for carrying out each of these commands. The programmer can then select those commands which are needed to cause the machine to move in a certain desired path. A key pad is provided for this purpose as part of computer 90. For example, the vehicle may be told to move forward until it reaches the first bar coded target and then turn right 90 degrees and proceed to the second bar coded target plus 10 feet and then turn left. The vehicle keeps track of where it is by counting bar coded targets as they are passed. This is done by the infrared photoelectric sensor 70 which moves with the laser positioner. Since the laser positioner is always aligned with the targets, the sensor 70 will detect light reflected from a target as the vehicle passes underneath it. This information is supplied to the computer 90 which keeps track of how many bar coded targets have been passed.

The computer also keeps track of distance traveled since the last bar coded target through the sensor 120A.

When the program includes an instruction to perform a given function at distance x past bar coded target y, the computer is able to do so by virtue of the distance measurement at 120A. This measurement is reset as each bar coded target is detected by the sensor 70.

Thus, it can be seen that it is critical that a proper count of the targets be kept by sensor 70. However, the infrared beam of sensor 70 can be reflected back from extraneous surfaces such as ceiling lights, as well as from targets 16. This can produce a miscount which would throw off the navigation. To avoid this problem, bar coded targets are used at each position where a computer command is required, i.e., a turn or offset or stop. These targets would all be coded alike. The sensor 70 will look at all of the targets but only bar-coded ones will be counted and used by the computer to initiate programmed actions.

In a similar manner, the laser codes can be used to prevent confusion which might arise under certain conditions. Consider a scrubber working in an area that is so wide it requires six passes to scrub the entire area. The laser positioner can offset the machine enough so it can scrub two passes with one row of targets, but six passes require three rows of targets. If three rows of identical targets are installed, the laser will scan all of them and become confused as to which row to follow. So laser coded targets are used in multiple row situations. All the targets in each row are coded alike, with the codes of each row different from any other. Then the computer will cause the machine to follow only the targets having the code which is programmed into it for given part of the path. When the machine is ready to shift to a different row of targets, the computer's program will direct it to follow a new set of laser codes.

An important feature of the vehicle is that it can turn without having to stop either before or after a turn is made. This is done by signaling the ramp circuits 94 to apply the necessary differential power to the drive motors. As the vehicle swings through a turn, the scanning angle S of the laser scanner will encompass the next target well before the turn has been completed. This gives the laser tracking device ample time to correct the angle of elevation to regain the target-in-view signal. Thus, the laser tracker will have found and locked onto the next target before the turn is completed so there is no stoppage required to allow the guidance systems to get their bearings. The turn simply becomes a matter of appropriate motor control to effect the turn and then continue on.

X. Operation of the Computer

The computer 90 has hardware which includes a microprocessor, a watchdog timer, a clock/timer, a 64k byte battery-protected RAM, a beeper, one single connector, an RS-232 I/O port, a key pad, and a single line, ¾ inch LCD display (24 character). The connector includes the following signals: 12 volts in, ground, key pads in, fault input, photo sensor in, left and right velocity inputs, speed out, stop motors out, reverse motors (works with speed select), turn right x degrees, turn left x degrees, laser position x, machine functions such as sweeper brush, vacuum fan, etc., data out RS232 and data in RS232. It will be obvious to those skilled in computer design that many variations on this architecture are possible.

The computer software has three major sections: an external interrupt routine, a timer interrupt routine and a main program. The external interrupt routine scans all input lines such as the target counter and the two motion sensor inputs and the fault input. The timer interrupt routine is used to keep track of functions requiring time measurements such as the start/stop of the machine at prescribed times and shutdown upon extended loss of the target-in-view signal.

The main program includes the following sections: keyscan, for scanning the input keys for program entry; inscan, for scanning inputs and incrementing counters; omode, for determining operating mode as either program or run; hicomm, a high level communications routine; and housekeeping for printing error messages on the display, changing modes and miscellaneous odd jobs.

The software commands include: home, wait x seconds, wait until time of day, set time, move forward x targets, turn right x degrees, turn left x degrees, jump to x program, laser position x, shut down, speed select, stop at x for temporary fault, reverse, reverse speed, load memory, dump memory and end of program.

Subroutines are provided to carry out the above commands which relate to machine operation. There are also subroutines for normal startup and shutdown sequences, gradual and emergency shutdowns and sweeper functions such as operating the vacuum fan, a warning horn or a strobe light. There is enough space in the computer memory to write up to 100 subroutines that can be called up at any time with two keystrokes. This type of programming makes it very easy to write a program for a path and store it in the memory under one of the main program numbers.

The computer as configured above is capable of storing up to 127 main programs of 5000 steps each. Obviously, this could be expanded if needed. Each main program comprises a collection of subroutines required to make the vehicle follow a certain course. For example, a main program may direct the machine to start up at a given time of day, move forward at full speed to the first bar coded target, turn left 90 degrees, go forward to the second bar coded target plus five feet and turn right 90 degrees, etc. It will be understood that the desired sweep functions can also be entered into the program as well as the path instructions.

The program can be entered directly through the key pad. Or it can be "taught" to the computer by manually walking the machine through the desired course once, with the computer recording the target counts and course changes. The manual control handlebars are connected to the laser positioner for the purpose of selecting the laser positions that would produce the desired course.

It can be seen that the present invention provides an unmanned vehicle which is completely flexible in its path definition. The targets can easily be placed in a chosen arrangement and the computer can direct the vehicle to follow various paths even with a fixed arrangement of targets. The guidance system will maintain the vehicle on the course prescribed by the computer.

Whereas a preferred form of the invention has been shown and described, it will be realized that alterations and modifications may be made thereto without departing from the scope of the following claims. By way of example only, the following alterations could be made. A continuous reflective tape can be installed instead of discreet reflective targets. In that case the vertical laser tracker would not be used; the laser would point at a fixed angle forward and up. Or a track could be set up with some sections having targets and other sections having tape.

Also, the vertical movement of the laser beam could be done with a fixed laser housing and a tiltable mirror or prism instead of tilting the laser housing.

Instead of the infrared target counter, a laser, radar, sonar or microwave unit could be used. The distance and velocity measurements could be made by a wheel count and clock. The guide ways of the laser positioner could be made two-stage telescopic to extend beyond the sides of the machine. Steering could be by means of steerable wheels instead of two-wheel differential steering.

If the machine were to be used outdoors, as in a parking lot, where overhead targets are not practical, reflective cat's eyes set in the pavement could be used as targets. The laser tracker would have to be modified so it could scan below horizontal. The rotating mirror in the laser transmitter (which causes the beam to scan laterally) could oscillate instead of rotate. The 10-turn potentiometer, an analog device, could be replaced by a rotary encoder. Both are resolvers.

We claim:

1. In an automated guided vehicle having a frame, drive means mounted on the frame for propelling the vehicle, and steering means associated with the frame for controlling the vehicle's direction of travel, an improved guidance system for controlling the drive means and steering means so as to guide the vehicle along a predetermined path, the guidance system comprising:
   a plurality of targets mounted along the desired path;
   sighting means mounted on the vehicle for determining the direction from the sighting means to a target, the sighting means including means for defining a reference line and for comparing the target direction to the reference line to determine a heading error angle;
   control means responsive to the sighting means for activating the drive means or steering means as required to steer the vehicle along a path defined by said reference line, by substantially reducing the heading error angle to zero; and
   positioning means for moving the sighting means laterally of the vehicle in one direction thereby deliberately inducing a non-zero heading error angle so that the control means will steer the vehicle in the opposite direction to regain a zero degree heading error angle, thereby causing the vehicle to move with the longitudinal center line of the vehicle being laterally offset and parallel to the reference line.

2. The vehicle of claim 1 wherein the targets are retroreflective and wherein the sighting means includes transmitting means for emitting a light beam aimed at the targets.

3. The vehicle of claim 2 wherein the sighting means further includes beam sweeping means for moving the light beam in a scanning plane.

4. The vehicle of claim 3 wherein the beam sweeping means moves the transmitted light beam through a scanning angle of less than 180 degrees.

5. The vehicle of claim 4 wherein the sighting means defines the reference line as the bisector of the scanning angle.

6. The vehicle of claim 5 wherein the sighting means is mounted on the vehicle such that the reference line is parallel to a vertical plane through the vehicle's longitudinal center line.

7. The vehicle of claim 2 wherein the sighting means further comprises receiving means for detecting said emitted light reflected from a target and defining a target-in-view signal when such light is detected, and the vehicle further comprises;
   tracking means on the vehicle for controlling the angle of elevation of the transmitted light beam, with reference to a horizontal plane, so as to maintain a target-in-view signal substantially continuously as the vehicle moves.

8. The vehicle of claim 7 wherein the transmitting means is pivotally mounted on the positioning means about a horizontal axis perpendicular to the reference line, and the tracking means comprises an actuator connected between the positioning means and transmitting means, responsive to the receiving means to pivot the transmitting means as required to maintain a target-in-view signal as the vehicle moves.

9. The vehicle of claim 1 wherein the positioning means further comprises feedback means for providing a signal indicative of the location of the sighting means.

10. The vehicle of claim 9 further characterized in that the feedback means includes a gear rack mounted on the vehicle frame and a resolver having a gear engageable with the rack to turn the resolver to vary its output as the positioning means moves the sighting means.

11. The vehicle of claim 1 wherein the positioning means further comprises at least one guide way mounted on the frame, a platform slidably mounted on the guide way and adapted for supporting the sighting means, a drive screw rotatably mounted on the frame and in driving relation with the platform, and a motor for driving the screw, thereby causing the platform to slide on the guide way.

12. The vehicle of claim 11 further comprising a feedback means including a gear rack mounted on the vehicle frame and a potentiometer attached to the platform and having a gear engageable with the rack to turn the potentiometer's wiper as the platform moves, thereby providing a signal indicative of the platform's position.

13. In an automated guided vehicle having a frame, drive means mounted on the frame for propelling the vehicle, and steering means associated with the frame for controlling the vehicle's direction of travel, an improved method of controlling the drive means and steering means so as to guide the vehicle along a predetermined path, the method comprising the steps of:
   placing a plurality of targets along the desired path;
   determining the direction from the vehicle to a target;
   defining a reference line;
   comparing the target direction to the reference line to determine a heading error angle;
   activating the drive means or steering means as required to steer the vehicle along a path defined by said reference line, by substantially reducing the heading error angle to zero; and
   moving the sighting means laterally of the vehicle in one direction thereby deliberately inducing a on-zero heading error angle so that the control means will steer the vehicle in the opposite direction to regain a zero degree handling error angle, thereby causing the vehicle to move with the longitudinal center line of the vehicle being laterally offset and parallel to the reference line.

14. The method of claim 13 wherein the targets are retroreflective and wherein the direction to one of the targets is determined by emitting a light beam aimed at the target.

15. The method of claim 14 further characterized by the step of moving the light beam in a scanning plane.

16. The method of claim 15 wherein the transmitted light beam is moved through a scanning angle of less than 180 degrees.

17. The method of claim 16 wherein the reference line is defined as the bisector of the scanning angle.

18. The method of claim 17 further characterized by the step of locating the reference line such that it is parallel to a vertical plane through the vehicle's longitudinal center line.

19. The method of claim 14 further comprising the steps of detecting transmitted light reflected from a target, defining a target-in-view signal when such light is detected, and controlling the angle of elevation of the transmitted light beam, with reference to a horizontal plane, so as to maintain a target-in-view signal substantially continuously as the vehicle moves.

20. The method of claim 13 further comprising the step of providing a feedback signal indicative of the location of the sighting means.

* * * * *